June 21, 1960  J. S. STEWART  2,941,574
APPARATUS FOR APPLYING COVERING
MATERIAL TO A MOLDED OBJECT
Original Filed Jan. 25, 1951  4 Sheets-Sheet 1

INVENTOR:
JOHN S. STEWART
BY
ATT'YS

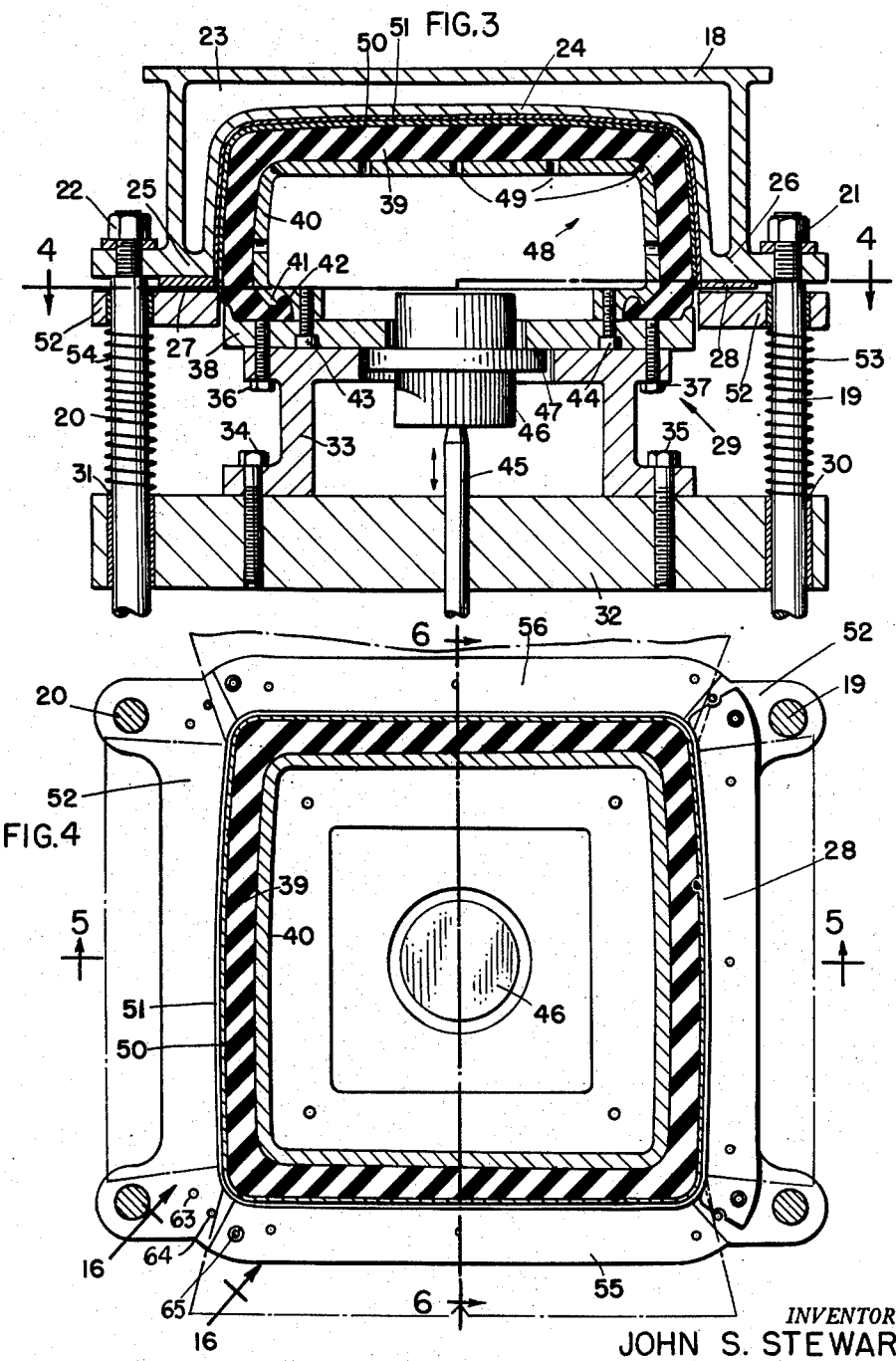

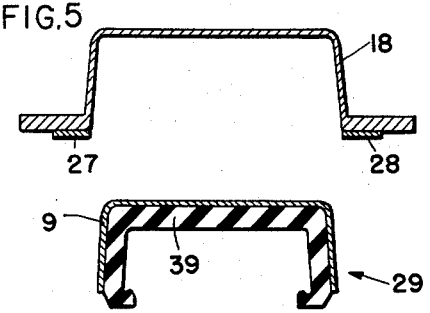
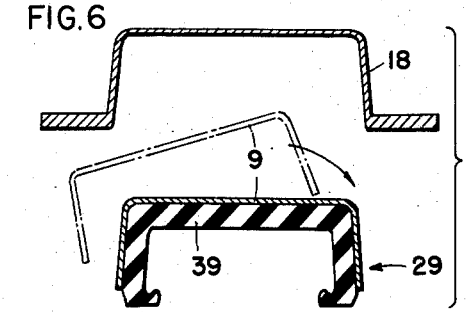
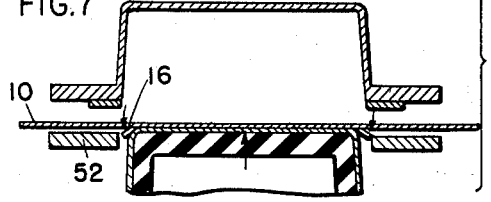
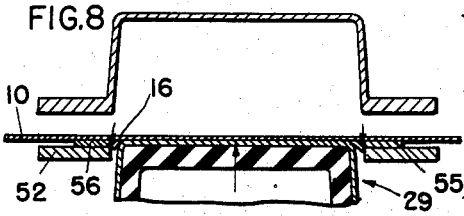
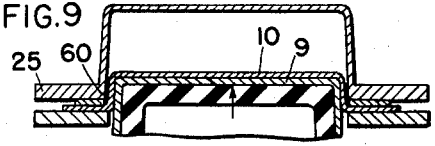
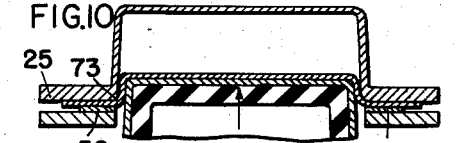
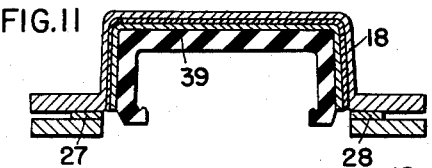
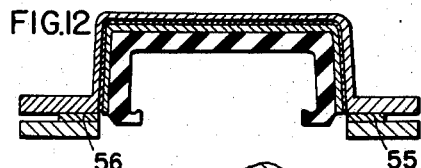
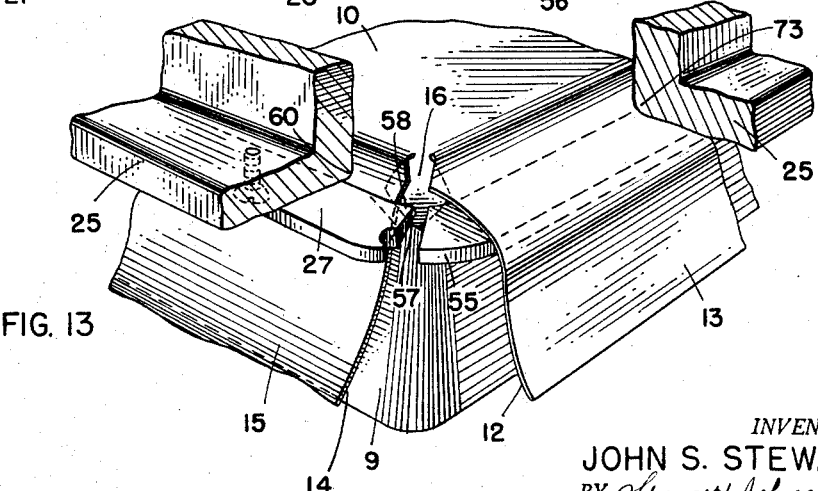

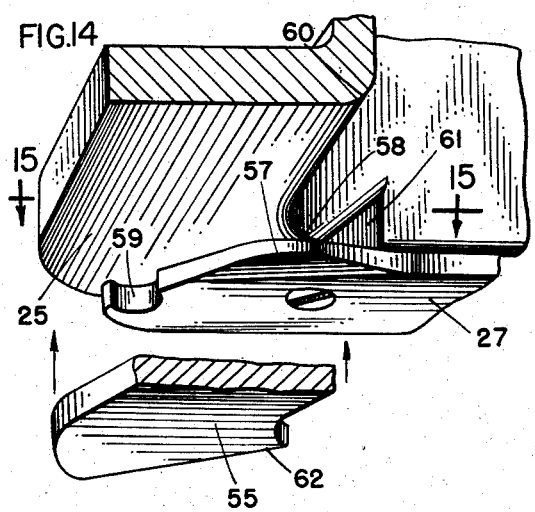
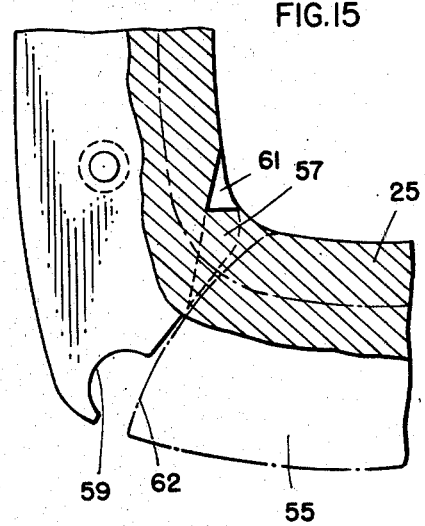
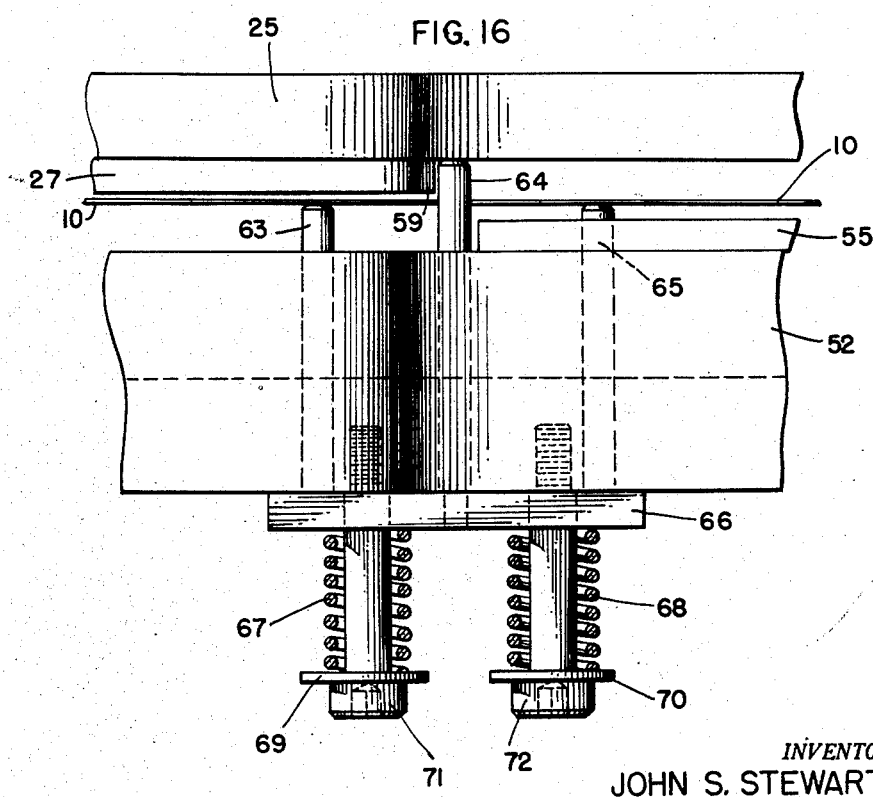

United States Patent Office 2,941,574
Patented June 21, 1960

2,941,574

APPARATUS FOR APPLYING COVERING MATERIAL TO A MOLDED OBJECT

John S. Stewart, St. Charles, Ill., assignor to Hawley Products Company, St. Charles, Ill., a corporation of Delaware Continuation of application Ser. No. 207,796, Jan. 25, 1951. This application Jan. 18, 1957, Ser. No. 635,928

7 Claims. (Cl. 154—41)

This invention relates to a covered article and particularly to an apparatus and method for applying a covering material to a three dimensional article, as for example, luggage, portable typewriter cases, and the like.

This application is a continuation of my copending application Serial No. 207,796 filed January 25, 1951, and now abandoned.

It is one object of the invention to provide a method for applying a covering material to articles having outwardly curved sides.

Another object of the invention is to provide a method for overlapping two pieces of covering material to provide smooth, rounded edges at the corners of hollow articles of generally rectangular cross section.

A further object of the invention is to provide a new and improved method for selectively positioning overlapping pieces of covering material at the corners of box-like articles.

Another object of the invention is to provide a new and useful apparatus for applying a covering material to an article.

Still another object of the invention is to provide an apparatus to selectively position cut pieces of covering material over the edges of an article and to overlap the pieces to form wrinkle-free, rounded joints.

A further object of the invention is to provide a covered molded article characterized by non-planar surfaces and rounded edges.

These and other objects and advantages of the invention will become more apparent from a consideration of the following description taken in conjunction with the accompanying drawings in which:

Fig. 3 is a transverse sectional view through one embodiment of the apparatus of the invention;

Fig. 4 is a sectional view taken along the lines 4—4 of Fig. 3;

Figures 5, 7, 9 and 11 are sectional views taken along the line 5—5 of Fig. 4 illustrating steps of the covering operation in sequence;

Figs. 6, 8, 10 and 12 are sectional views taken along line 6—6 of Fig. 4 and corresponding to Figs. 5, 7, 9 and 11, respectively;

Fig. 13 is a diagrammatic view with parts broken away of the corner forming apparatus of the invention;

Fig. 14 is a diagrammatic view of the broken away portion of the corner forming apparatus of Fig. 13 partially exploded;

Fig. 15 is a sectional view taken along lines 15—15 of Fig. 14; and

Fig. 16 is an enlarged partial elevational view along 16—16 of Fig. 4.

Generally stated the invention contemplates the provision of an article characterized by non-planar side and end surfaces and rounded edges and corners, and a smooth-fitting, bonded covering of sheet material thereon having overlapped portions at the rounded edges and corners. The invention further contemplates a method and apparatus for applying a wrinkle-free cover sheath of covering material to a molded article characterized by non-planar side and end surfaces and rounded edges and corners. An apparatus is provided which selectively positions overlapping layers of a covering sheet material on a molded preform and presses the covering and preform together so that they become securely bonded by a layer of adhesive.

Figure 1:
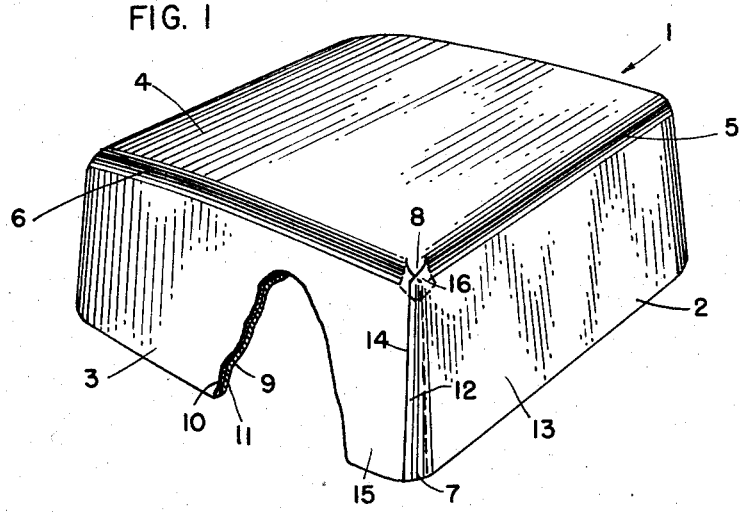
Fig. 1 is a perspective view with parts broken away of an article prepared according to the practice of the invention.

In the drawings the article 1 is illustrated in Fig. 1 as being comprised of non-planar side portions 2 and 3 and a non-planar top portion 4. The side 2 and the top 4 are joined through the rounded juncture 5 and the side 3 and top 4 are joined through the rounded juncture 6. The side 2 and the side 3 are joined through the rounded edge 7. The junctures 5 and 6 and the edge 7 converge into a single integral rounded corner 8.

Figure 2:
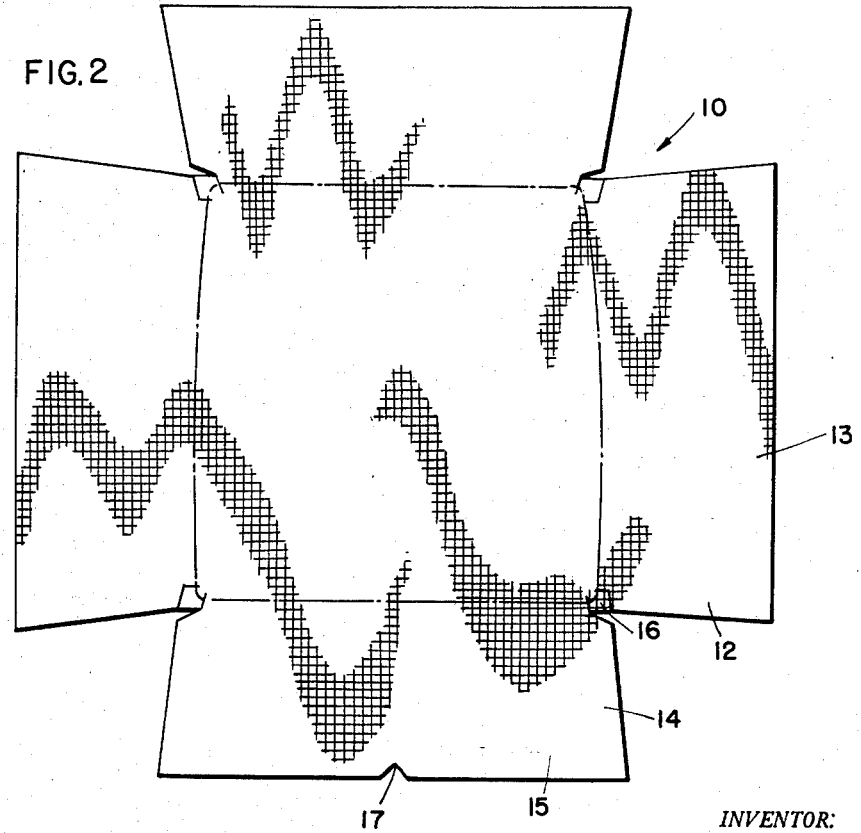
Fig. 2 is a top plan view of a piece of covering material in position on a preform prior to the covering step.

The article 1 is further illustrated in Fig. 1 at the broken away portion as being comprised of the molded fibrous preform 9 and the covering portion 10 which is securely bonded to the preform 9 by means of a layer of adhesive 11. The overlapping end 12 of the side panel 13 of the covering 10 is illustrated in Figs. 1 and 2. The underlapping end 14 of the side panel 15 of the covering 10 is adapted to underlie the end 12 of the side panel 13. An underlapping diamond-shaped tab 16 is severed from the side panels 13 and 15 but is connected to the main body of the covering 10. In the finished article the tab 16 is positioned underneath the ends 12 and 14. A notch 17 is illustrated in Fig. 2 and is provided as a convenient means for marking the position of the covering 10 during the application step.

Details of the apparatus are illustrated in Figs. 3, 4 and 13 to 16. In Fig. 3 the complete apparatus is shown in section as it appears during the final stages of the application. A female die 18 is positioned on the supporting rods 19 and 20 and is held in position by the bolts 21 and 22. The die 18 has an enclosed space 23 into which a source (not shown) of heat, such as steam or hot air, is directed. The purpose of the heat is to cause the adhesive material to function, as will be more fully explained hereinafter. The inner face 24 of the die 18 is characterized by non-planar surfaces. The exterior shape of the finished article will correspond to the shape of the face 24. At the flanged portions 25 and 26 a pair of cover positioning members 27 and 28 are located.

Complementary with the female die 18 is the male die 29. The entire assembly of the male die 29 is adapted to slide vertically on the supporting rods 19 and 20 through the openings 30 and 31 in the base plate 32. Resting upon the base plate 32 is a support 33 which is secured to the base 32 by means of the bolts 34 and 35. A pair of bolts 36 and 37 are employed to secure an auxiliary plate 38 to the support 33. A resilient die face member in the form of an expandable bag 39 is provided to overlie a rigid perforated plate 40, and to be held in position between the plate 40 and the plate 38 by means of the protuberance 41 and the recess 42 in the perforated plate 40. The perforated plate 40 and the auxiliary plate 38 are held in position by means of the bolts 43 and 44.

The male die assembly 29 is propelled upwardly into contact with the female die 18 by advancing the shaft 45 by a suitable means (not shown), such as a hydraulic piston arrangement. The annular shoulder 47 of the head 46 is fastened to the auxiliary die plate 38. The end of the shaft 45 in its uppermost position seats in an opening (not shown) in the base of head member 46. The enclosed space 48 is adapted to receive a fluid under pressure from a suitable source (not shown) which will be transmitted through the openings 49—49 to the resilient die member 39, which in turn will be forced outwardly from the plate 40 until it has taken the general shape of the inner die face 24 of the female die 18. As illustrated in Fig. 3 a molded article 50 and a sheath or cover therefor 51 will be forced into intimate contact with one enother between the face 24 of the female die 18 and the resilient die face member 39 of the male die 29 upon the application of fluid pressure to the space 48 in the male die 29.

In Figs. 3 and 4 a draw ring 52 is illustrated in position about the male die member 29. The ring 52 is adapted for vertical movement on rods 19 and 20 and is urged upwardly into position by the springs 53 and 54 or by a suitable foot-operated treadle mechanism (not shown). Cover positioning members 55 and 56 are located on opposite sides of the ring 52. The cover positioning members 55 and 56 are adapted to complement the cover positioning members 27 and 28. The complemental action of the members 55 and 56 on the draw ring 52 with the members 27 and 28 on the female die will be described in greater detail hereinafter, particularly with reference to Figs. 14, 15 and 16.

In Fig. 14 the member 27 is illustrated in fixed position with reference to the flanged portion 25 of the female die 18. The member 27 has a thin leading edge 57 at the tip 58 and gradually thickness towards the center of the die. The thinned portion 57 plays an important part in the positioning of the cover on the preformed article without binding or wrinkling. The arcuate recess 59 is provided near the end of the member 27 in order that the member may seek its proper position about a locating pin 64. The flanged portion 25 of the female die 18 is rounded at its inner edge 60 in such fashion that it will press out any wrinkles in the covering material as it passes. A notch 61 (Fig. 15) in the female die assists in preventing binding of the cover during the positioning step. The member 55 is illustrated in advancing position with the leading edge 62 adapted to approach the member 27 in close relationship.

In Fig. 13 the relation of the dies is diagrammatically illustrated in the position they assume at one step in the covering operation. The cover positioning member 27 on the flanged portion 25 of the female die (not shown) assumes a position slightly above that of the member 55. The side panel 15 of the cover 10 is adapted to pass between the number 27 and the molded preform 9 during the covering operation. The diamond-shaped tab 16 is first positioned so that the side panel 15 will overlap a portion of it. The construction of the tip 58 of the member 27 is such that it in combination with the rounded edge 60 of the portion 25 will press the panel 15 tightly against the preform 9 and will smooth out any wrinkles which might occur. The thinned edge portion 57 of the member 27 performs its important function at this stage by allowing the panel 15 to slide underneath with a slight lateral motion at the same time increasing the pressure towards the center of the die in a manner which successfully eliminates any wrinkles from the rounded corner portion without binding the materials. The member 55 is positioned beneath the panel 13 and acts to hold it out of contact with the preform 9 until the panel 15 has been laid in position. At this point the rounded edge 73 of the portion 25 presses the panel 13 against the former 9. The overlapping end 12 of the panel 13 assumes an overlapping position with respect to the end 14 of the panel 15. All of this is done automatically without the intervention of an operator.

In Fig. 16 the members 27 and 55 are shown in position near the first step of the process where one portion of the cover 10 is being laid underneath the member 27 and another portion of the cover is being laid over the member 55. The positioning pins 63, 64 and 65 are so located at each corner of the apparatus (Fig. 4) that the longer pin 64 passes through the arcuate recess 59 in the member 27 and contacts the underside of the flanged portion 25. The two flanking pins 63 and 65 extend through the draw ring 52 and seat in a support 66. The support rests upon a pair of coiled springs 67 and 68 which press against the washers 69 and 70 and are located about the bolts 71 and 72. As the draw ring 52 and the flanged portion 25 come close together, the pins will be depressed and will cause compression of the springs 67 and 68.

Figs. 5, 7, 9 and 11 and Figs. 6, 8, 10 and 12, respectively, show four different positions of the apparatus during the covering operation. In Figs. 5 and 6 it will be noted that the female die 18 is stationarily located directly above the upwardly rising male die 29. A molded preform 9 has previously been positioned on the male die 29 over the resilient die face member 39. In Fig. 5 the cover positioning members 27 and 28 are illustrated.

In Figs. 7 and 8, the male die 29 has advanced to a position directly beneath the female die 18 and a cover 10, which has previously been cut to the design shown in Fig. 2, is placed over the preformed articles 9 on the male die 29. The tabs 16 have been bent into position to underlie the side panels.

In Fig. 8 the draw ring 52 is shown in place with the cover positioning die members 55 and 56 resting thereon.

In Figs. 9 and 10 the male die has advanced part way into the female die and the covering operation has been partly performed. The cover 10 has been pressed tightly against the preform 9 at the upper edges of the preform 9 and two of the side panels are being underlaid by the action of the members 27 and 28 and the edge 60 of the portion 25.

In Fig. 10 the opposite panels are being laid in overlapping relation by the action of the members 55 and 56 and the rounded edge 73 of the portion 25.

In Figs. 11 and 12 the covering operation is complete and the covered article is forced to take on the shape of the inner face of the die 18 by pressure applied from the inside by the resilient element 39. It will be noted that the members 27 and 28 now occupy the same plane as the members 55 and 56. Following the application of pressure to the inner surface of the element 39, the male die 29 is retracted and the covered article is removed therefrom. Thereafter the apparatus is in position to repeat the cycle described above.

The method and apparatus described hereinabove may take numerous other forms and shapes than the one described herein for purposes of illustration. The invention is adaptable to the laying of the other surfacing materials on other types of preform bodies and is especially useful in the covering of articles which are characterized by non-planar surfaces and rounded corners and edges.

The preform illustrated herein is suitably prepared by waterlaying fibrous materials from an aqueous slurry thereof in a manner generally known in this art. Where additional strength is desired in the finished article, it may be desirable to incorporate a resinous material with the fibers in any suitable manner. For example, the blank of waterlaid fibers may be impregnated with a resin and the article subsequently heated to set the resin. Another process involves the addition of a resin to an aqueous slurry of fibers followed by the precipitation of the resin about the individual fibers prior to the waterlaying step.

The invention is not limited to the employment of any particular type of covering material or to any particular adhesive for bonding the covering to the preform. Woven materials made from long-wearing fibers or from plastic materials are very suitable. Leather, plastic sheet and simulated leathers are all contemplated by the invention.

From the foregoing description of the invention it will be seen that it is now possible to prepare an article comprised of a molded fibrous body characterized by nonplanar side and end surfaces and rounded corners and edges, and a smooth-fitting cover characterized by overlapping ends at the rounded edges and corners. The article combines the useful features of light weight and exceptional strength with pleasing design. The invention also makes possible the covering of a molded body having nonplanar surfaces and rounded edges automatically in a machine operation, at the same time achieving a smooth fit at all of the rounded edges.

I claim:

1. In an apparatus for covering a molded hollow article having corners with a sheet material covering, the combination of a male die comprising a supporting member, and an expanding bag normally mounted on said supporting member in covering juxtaposition thereto in position to supportingly receive said article, a female die having an outwardly extending flange around the open end thereof and adapted to receive said article with said sheet material covering thereon, means to bring said dies together in complemental relationship with said molded hollow article and said sheet material covering therebetween, a draw ring surrounding said male die in spaced relationship adapted to support said covering material adjacent its edges before said dies are brought together, said draw ring being movable to a position adjacent said flange to clamp said sheet material between said draw ring and said flange, means to guide said draw ring during said movement, means for resiliently holding said draw ring supporting said covering sheet material in contact with said flange when said dies are brought together, and means for inflating said bag.

2. In an apparatus for covering a molded hollow article having corners with a sheet material covering, the combination of a male die comprising a supporting member, and an expanding bag normally mounted on said supporting member in covering juxtaposition thereto in position to supportingly receive said article, a female die having an outwardly extending flange around the open end thereof and adapted to receive said article with said sheet material covering thereon, means to bring said dies together in complemental relationship with said molded hollow article and said sheet material covering therebetween, a draw ring surrounding said male die in spaced relationship adapted to support said covering material adjacent its edges before said dies are brought together, said draw ring being movable with respect to said male die and movable with said male die to a position adjacent said flange to clamp said sheet material between said draw ring and said flange, means to guide said draw ring during said movement, means for resiliently holding said draw ring supporting said covering sheet material in contact with said flange when said dies are brought together, and means connected to said male die for applying outward-expanding pressure on said bag when said dies are brought together.

3. In an apparatus for covering a molded hollow article having corners with a sheet material covering, the combination of a male die comprising a supporting member, and an expanding bag secured thereon in position to be normally disposed in covering juxtaposition thereto in position to supportingly receive said article, a female die having an outwardly extending flange around the open end thereof and adapted to receive said article with said sheet material covering thereon, means to bring said dies together in complemental relationship with said molded hollow article and said sheet material covering therebetween, a draw ring surrounding said male die in spaced relationship adapted to support said covering material adjacent its edges before said dies are brought together, said draw ring being movable with respect to said male die and movable to a position adjacent said flange to clamp said sheet material between said draw ring and said flange, means to guide said draw ring during said movement, means for resiliently holding said draw ring supporting said covering sheet material in contact with said flange while said male die is entering said female die thereby pulling said cover over said article, means for retracting said draw ring from its position adjacent said flange, means for retracting said male die from said female die to permit removal of the resultant covered article, and means on said male die for applying inflating pressure to said bag.

4. An apparatus for applying a covering material to a box-like molded preform having a non-planar end portion, non-planar side portions and rounded edges and corners which comprises a stationary female die having non-planar die surfaces, an axially reciprocating male die comprising a hollow perforate form, a resilient member covering said form and adapted to respond to fluid pressure applied to the interior of said form to press said covering material into contact with said preform, means to apply said fluid pressure, a plurality of cover positioning members attached to said female die, a movable ring member mounted independently and intermediately of said male and female dies, a plurality of complementary cover positioning members attached to said ring member, said positioning members being adapted to guide, stretch and progressively lay said material on said side portions and for progressively overlapping said material in wrinkle-free fit at said rounded edges and corners during the reciprocal motion of said male die.

5. An apparatus for covering hollow articles of the class described comprising a male die member adapted to fit within the article to be covered, a femal die adapted to fit over the exterior of the covered article, said female die having an outwardly extending flanged portion, a cover positioning member affixed to said flanged portion comprising an elongated piece of metal having an end portion characterized by increasing thickness from the edge to the center, a draw member spaced from said male die provided with a cover positioning member adapted to cooperate with the cover positioning member on the flanged portion of the female die to progressively overlap the edges of a covering of sheet material in a wrinkle-free joint, and means to move said dies and said draw member cooperatively one with respect to the other to cause a covering of sheet material to be applied to said article and to be overlapped at the edges thereof.

6. An apparatus for covering hollow articles of the class described comprising a male die member adapted to fit within the article to be covered, an expandable face member thereon, a female die adapted to fit over the exterior of the covered article, said female die having an outwardly extending flanged portion, a cover positioning member affixed to said flanged portion, a notch in said portion, a tapered area in said positoning member characterized by increasing thickness from the edge to the center, said notch and said area cooperating to stretch and smooth a covering material without binding, a draw member spaced from said male die provided with a cover positioning member adapted to cooperate with the cover positioning member on the flanged portion of the female die to progressively overlap the edges of said cover in a wrinkle-free joint, and means to move said dies and said draw member cooperatively one with respect to the other to cause a covering of sheet material to be applied to said article and to be overlapped at the edges thereof.

7. An apparatus for covering hollow articles of the class described comprising a male die member adapted to fit within the article to be covered, a female die adapted to fit over the exterior of the covered article, said female die having an outwardly extending flange portion having a substantially V-shaped notch on the underside thereof, a cover positioning member affixed to said flanged portion comprising an elongated piece of metal having a tapered portion characterized by increasing thickness from the edge to the center and a recess adapted to receve a guide pin, said notch and said tapered portion cooperating to stretch and smooth a covering material without binding, a draw member spaced from said male die provided with a second cover positioning member adapted to cooperate with the cover positioning member on the flanged portion of the female die to progressively overlap the edges of said cover in a wrinkle-free joint, and means to move said dies and said draw member cooperatively one with respect to the other to cause a covering of sheet material to be applied to said article and to be overlapped thereon.

References Cited in the file of this patent

UNITED STATES PATENTS

| | | |
|---|---|---|
| 2,190,807 | Steinberger | Feb. 20, 1940 |
| 2,312,332 | Gramelspacher | Mar. 2, 1943 |
| 2,425,390 | Palmer et al. | Aug. 12, 1947 |
| 2,452,999 | Daly et al. | Nov. 2, 1948 |